US012786048B2

(12) United States Patent
Yatagai et al.

(10) Patent No.: US 12,786,048 B2
(45) Date of Patent: Nov. 3, 2026

(54) LOG ANALYSIS WHEN FAILURE OCCURS IN VIRTUALIZATION ENVIRONMENT

(71) Applicant: Rakuten Mobile, Inc., Tokyo (JP)

(72) Inventors: Hiroya Yatagai, Tokyo (JP); Masaaki Kosugi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 30 days.

(21) Appl. No.: 18/959,616

(22) Filed: Nov. 26, 2024

(65) Prior Publication Data

US 2025/0240203 A1 Jul. 24, 2025

(30) Foreign Application Priority Data

Jan. 24, 2024 (JP) ................................ 2024-008619

(51) Int. Cl.
*G06F 15/173* (2006.01)
*H04L 41/069* (2022.01)
*H04L 41/22* (2022.01)

(52) U.S. Cl.
CPC ............ *H04L 41/069* (2013.01); *H04L 41/22* (2013.01)

(58) Field of Classification Search
CPC .............................. H04L 41/069; H04L 41/22
See application file for complete search history.

(56) References Cited

U.S. PATENT DOCUMENTS 11,226,858 B1 * 1/2022 Srivastava ............ G06F 11/079
11,546,243 B1 * 1/2023 Menon .................... H04L 43/10
2017/0364843 A1 * 12/2017 Haligowski ........ G06Q 10/0633
2018/0024852 A1 1/2018 Yabushita et al.
2022/0101115 A1 * 3/2022 Zhou .................. G06F 11/0769

FOREIGN PATENT DOCUMENTS

WO 2016121802 A1 8/2016

* cited by examiner

*Primary Examiner* — Joseph R Maniwang
(74) *Attorney, Agent, or Firm* — HAUPTMAN HAM, LLP

(57) ABSTRACT

There is provided a network management apparatus performing a first storage process, a second storage process, a search process, and a presentation process. The first storage process stores logs of a plurality of components constituting a virtualization environment of a network. The second storage process stores correspondence information in which, for each failure that may occur in the network, error logs of the plurality of components related to the failure are associated with each other. The search process searches, when a failure occurs in the network, based on an error log of a first component among the plurality of components, for an error log of a second component related to the failure from the stored logs using the correspondence information. The presentation process presents a result of the search to a user.

7 Claims, 13 Drawing Sheets

150b

| TARGET APPLICATION/ INFRASTRUCTURE NAME | LOG TYPE | LOG NAME | ERROR LOG | KEYWORD |
|---|---|---|---|---|
| APP1 | APP | Log1 | ERR:aaaa | KEY_1 |
| APP2 | APP | Log2 | ERR:bbbb | KEY_2 |
| : | : | : | : | : |
| SERVER1 | SEL | Log11 | ERR:cccc | KEY_A |
| SERVER1 | SEL | Log12 | ERR:dddd | KEY_B |
| SERVER1 | SEL | Log13 | ERR:eeee | KEY_C |
| : | : | : | : | : |

FIG. 4

150a

| APPLICATION KEYWORD | INFRASTRUCTURE KEYWORD | DETAILED DESCRIPTION |
|---|---|---|
| KEY_1 | KEY_A | xxxxxxx |
| KEY_1 | KEY_B | xxxxxxx |
| KEY_1 | KEY_C | xxxxxxx |
| KEY_2 | - | xxxxxxx |
| : | : | : |

FIG. 5

150b

| TARGET APPLICATION/ INFRASTRUCTURE NAME | LOG TYPE | LOG NAME | ERROR LOG | KEYWORD |
|---|---|---|---|---|
| APP1 | APP | Log1 | ERR:aaaa | KEY_1 |
| APP2 | APP | Log2 | ERR:bbbb | KEY_2 |
| : | : | : | : | : |
| SERVER1 | SEL | Log11 | ERR:cccc | KEY_A |
| SERVER1 | SEL | Log12 | ERR:dddd | KEY_B |
| SERVER1 | SEL | Log13 | ERR:eeee | KEY_C |
| : | : | : | : | : |

LOG ANALYSIS WHEN FAILURE OCCURS IN VIRTUALIZATION ENVIRONMENT

CROSS-REFERENCE TO RELATED APPLICATION

This application claims priority to a Japanese Patent Application No. 2024-008619, filed on Jan. 24, 2024; the entire contents of which are incorporated herein by reference.

FIELD

The present disclosure relates to log analysis when a failure occurs in a virtualization environment.

BACKGROUND

The information disclosed in this background section is only for enhancement of understanding of the general background of the disclosure and should not be taken as an acknowledgement or any form of suggestion that this information forms the prior art already known to a person skilled in the art.

With a background of improved performance of general-purpose servers and enriched network infrastructures, cloud computing (hereinafter simply referred to as "cloud"), which on demand uses computing resources that are virtualized on physical resources such as servers, has become widely prevailing. Furthermore, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1: WO2016/121802 A).

LISTING OF REFERENCES

Patent Literature

PATENT LITERATURE 1: International Publication of PCT International Patent Application No. WO2016/121802 A

SUMMARY

Technical Problem to be Solved

Recent telecom networks are virtualized networks in which applications constituting the Virtualized Network Functions (VNFs) are mounted on a set of virtualized infrastructure servers (i.e., compute nodes). In such a virtualized network, when a failure occurs in the virtualized infrastructure, applications thereon may also be affected.

When some sort of failure occurs in the network, first, primary analysis is performed to identify a location where the failure is considered to have occurred (i.e., suspected location) and a range to be affected by the failure. In order to perform the primary analysis, it is required to analyze logs of respective components.

However, in a large-scale network such as the telecom network, an entity in charge of a virtualized infrastructure (i.e., infrastructure owner) and an entity in charge of an application (i.e., application owner) are likely to be divided into separate organizations (e.g., separate departments, separate companies), and development of a system is promoted based on a division of labor. Therefore, each of the owners may be in an environment where they cannot refer to each other's log, or the definition of the log of each component may be different depending on the developer.

For this reason, it is likely to be difficult for the infrastructure owner to identify the range to be affected by the failure, which has occurred in the virtualized infrastructure, on the application. Likewise, it is likely to be difficult for the application owner to identify whether the cause of the failure, which has occurred in the application, is on the virtualized infrastructure side or the application side. As a result, communication costs may increase, and it may take longer to analyze the log and resolve the problem.

The present disclosure has been made in order to promptly perform primary analysis of logs when a failure occurs in the virtualization environment.

According to one aspect of the present disclosure, there is provided a network management apparatus comprising one or more processors, at least one of the processors performing processing comprising a first storage process, a second storage process, a search process, and a presentation process. The first storage process is processing of storing logs of a plurality of components constituting a virtualization environment of a network. The second storage process is processing of storing correspondence information in which, for each failure that may occur in the network, error logs of the plurality of components related to the failure are associated with each other. The search process is processing of searching, when a failure occurs in the network, based on an error log of a first component among the plurality of components, for an error log of a second component related to the failure from the stored logs using the correspondence information. The presentation process of presenting a result of the search to a user.

According to another aspect of the present disclosure, there is provided a network management method comprising: storing logs of a plurality of components constituting a virtualization environment of a network; storing correspondence information in which, for each failure that may occur in the network, error logs of the plurality of components related to the failure are associated with each other; when a failure occurs in the network, searching, based on an error log of a first component among the plurality of components, for an error log of a second component related to the failure from the stored logs using the correspondence information; and presenting a result of the search to a user.

According to yet another aspect of the present disclosure, there is provided a network management system comprising one or more processors, at least one of the one or more processors performing processing comprising a first storage process, a second storage process, a search process, and a presentation process. The first storage process is processing of storing logs of a plurality of components constituting a virtualization environment of a network. The second storage process is processing of storing correspondence information in which, for each failure that may occur in the network, error logs of the plurality of components related to the failure are associated with each other. The search process of searching, when a failure occurs in the network, based on an error log of a first component among the plurality of components, for an error log of a second component related to the failure from the stored logs using the correspondence information. The presentation process of presenting a result of the search to a user.

According to one aspect of the present disclosure, it makes it possible to promptly perform primary analysis of logs when a failure occurs in a virtualization environment.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

Features, aspects, and advantages of embodiments of the disclosure will be described below with reference to the accompanying drawings, in which like reference numerals denote like elements, and wherein:

FIG. 4 is a diagram illustrating an exemplary configuration of a log dictionary database;

FIG. 5 is a diagram illustrating an exemplary configuration of a log storage database;

DETAILED DESCRIPTION

Figure 1:
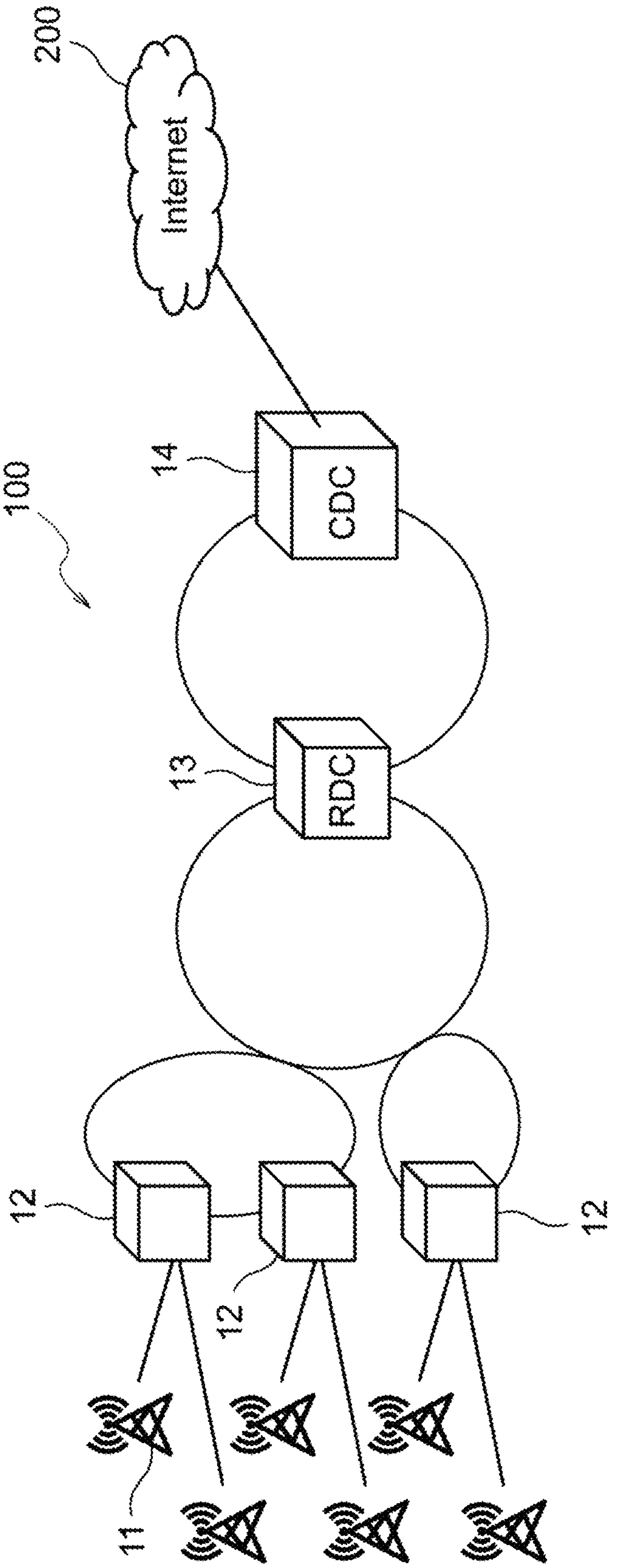
FIG. 1 is a diagram illustrating an exemplary configuration of a mobile network including a network management apparatus according to the present embodiment.

The following detailed description of example embodiments refers to the accompanying drawings. The present disclosure provides illustrations and descriptions, but is not intended to be exhaustive or to limit the implementations to the precise form disclosed. Modifications and variations are possible in light of the present disclosure or may be acquired from practice of the implementations. Further, one or more features or components of one embodiment may be incorporated into or combined with another embodiment (or one or more features of another embodiment). Additionally, the flowchart and description of operations provided below relate to at least one of the embodiments in the present disclosure. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, software, or a combination of hardware and software. The actual specialized control hardware or software code used to implement these systems and/or methods should not limit their implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, the particular combinations are not intended to limit the disclosure of implementations. In fact, many of these features may be combined in ways not specifically recited in the claims and/or disclosed in the specification. Even if a dependent claim directly depends on only one claim, the present disclosure may indicate that the dependent claim is dependent on other claims in the claim set.

No element, act, or instruction used herein should be construed as critical or essential unless explicitly described as such. Also, as used herein, the articles "a" and "an" (in other words, nouns not mentioned in the plural) are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has a log management function that manages a log when a failure occurs in a mobile network constructed on a virtualized infrastructure and performs primary analysis of the log.

The network management apparatus according to the present embodiment includes, as the log management function, a log sharing function and a log dictionary function. More specifically, the network management apparatus according to the present embodiment stores logs of a plurality of components constituting a virtualization environment of a network in a database for sharing logs. Furthermore, the network management apparatus stores a log dictionary that is correspondence information in which, for each failure that may occur in the network, error logs of the plurality of components related to the failure are associated with each other. Then, when a failure occurs in the network, the network management apparatus searches, based on an error log of a first component among the plurality of components, for an error log of a second component related to the failure from the logs stored in the database using the log dictionary.

Here, the correspondence information (i.e., log dictionary) may be information in which keywords representing the contents of the error logs of the plurality of components related to the failure are associated with each other. In this case, the network management apparatus may search, based on a keyword representing the contents of the error log of the first component, for a keyword representing the contents of the error log of the second component with reference to the log dictionary, and search for the error log of the second component from the logs stored in the database based on the searched keyword.

As a result, it makes it possible to automatically perform the primary analysis of isolating the cause of the failure and identifying the range to be affected by the failure when the failure occurs.

FIG. 1 is a diagram illustrating an exemplary network configuration of a mobile network 100 including the network management apparatus according to the present embodiment.

In the mobile network 100 illustrated in FIG. 1, mobile communicable terminals such as smartphones and the Radio Access Network (RAN) wirelessly communicate with each other, and information thereof is relayed through a backhaul network (i.e., mobile backhaul: MBH) and transmitted to a core network for processing. This allows the mobile communicable terminals to connect to the Internet 200 or connect to another company's network to make voice calls, or the like.

More specifically, the mobile network 100 includes base stations 11 and a plurality of accommodating stations 12 to 14. Here, the accommodating stations 12 are edge data centers, the accommodating station 13 is a Regional Data Center (RDC), and the accommodating station 14 is a Central Data Center (CDC). The backhaul network is constituted between the edge data centers 12 and the central data center 14.

The mobile network 100 according to the present embodiment is a virtualized network constructed on a virtualized infrastructure. The mobile network 100 realizes everything from the switching equipment of the backbone network to the radio access functions of the base stations by software on general-purpose servers.

The base station 11 is equipped with an antenna, a switchboard, a battery, and the like.

The edge data center 12 is located near the base station 11, and is connected to a plurality of base stations 11 via fiber optic cables or the like. The edge data center 12 realizes the RAN-related radio access functions.

The regional data center 13 is connected to a plurality of edge data centers 12 deployed in the target regions, respectively. The regional data center 13 realizes various applications, by software, for the firewall/Network Address Translation (NAT), the Content Distribution Network (CDN), and edge computing.

The central data center 14 is connected to a plurality of regional data centers 13. The central data center 14 realizes core functions such as the Evolved Packet Core (EPC) and the IP Multimedia Subsystem (IMS).

It should be noted that the number of respective data centers (i.e., accommodating stations) such as the edge data center 12, the regional data center 13, and the central data center 14 is not limited to the number illustrated in FIG. 1. For example, although only one regional data center 13 and one central data center 14 are illustrated in FIG. 1, there may be a plurality of regional data centers 13 and a plurality of central data centers 14, respectively.

Figure 2:
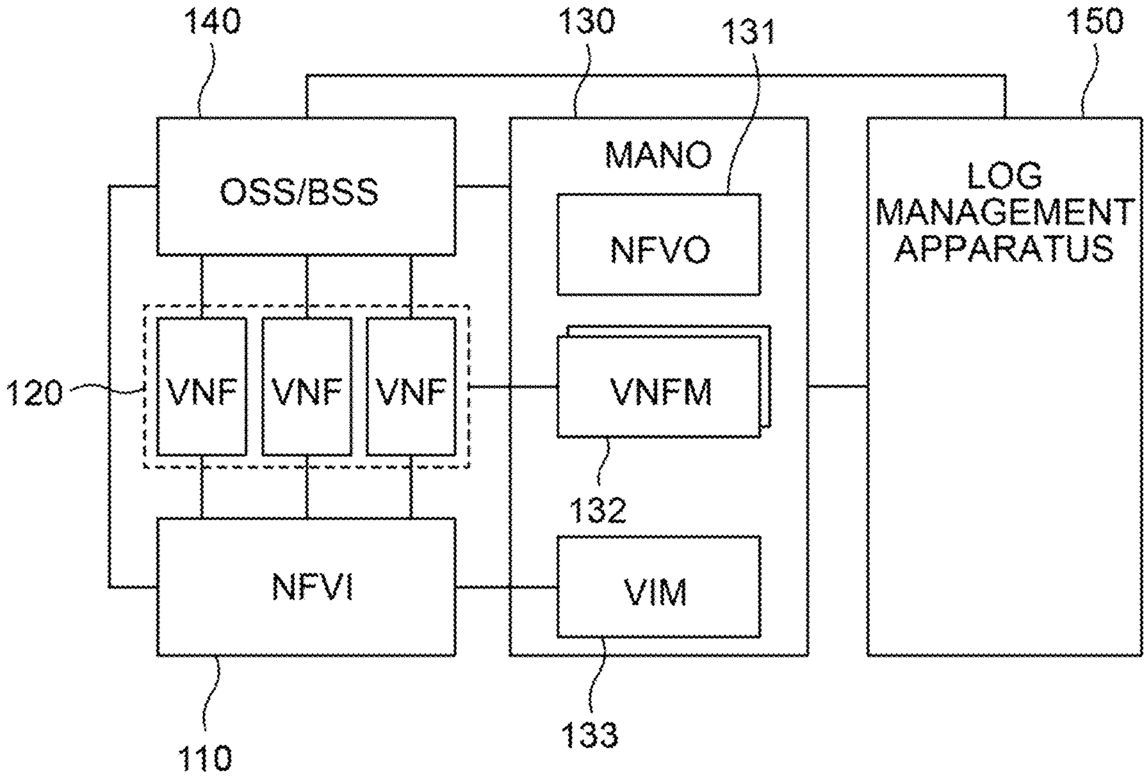
FIG. 2 is a diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements can send and receive information with each other.

The NFVI (NFV Infrastructure) 110 is a network function virtualized infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Virtual Network Function) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, and renders these hardware resources into virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to an application running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualization environment. In other words, the virtualization environment is constituted by three layers, in the bottom-up order namely: the hardware, the virtualization layer, and virtual machines.

In addition, in the following description, the NFVI 110, which is a component constituting the virtualization environment, is referred to as a "virtualized infrastructure", and the VNF 120, which is another component constituting the virtualization environment, is referred to as an "application".

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of the VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources used by the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

A log management apparatus 150 realizes a log management function that performs primary analysis of a log when a failure occurs. The log management apparatus 150 serves as the network management apparatus according to the present embodiment.

In the mobile network 100, when a failure occurs in the virtualized infrastructure, applications thereon may also be affected. When some sort of failure occurs in the network, it is required to perform primary analysis that analyzes a log of each of components to identify a location where the failure is considered to have occurred (i.e., suspected location) and a range to be affected by the failure. However, conventionally, considerable man-hours have been required for such primary analysis.

One of the reasons thereof is that an entity in charge of developing, constructing, and operating the virtualized infrastructure (i.e., infrastructure owner) and an entity in charge of developing, constructing, and operating applications constituting the VNF (i.e., application owner) are divided into separate organizations (e.g., separate departments, separate companies), and thus development of a system is promoted based on a division of labor. In such a case, the definition of the log on the virtualized infrastructure side may be different from the definition of the log on the application side, thus it may make it difficult for the infrastructure owner and the application owner to analyze each other's log.

In addition, another reason is that the application owner is in an environment difficult to refer to the log on the virtualized infrastructure side. Most of logs on the virtualized infrastructure side are often stored in a local area of a server constituting the virtualized infrastructure. Since the VNF has the nature that it is deployed on the above server, which is the shared resource, the access rights to the local area of the server must be restricted due to a security concern or the like.

Under such environment with the restricted access as described above, when a failure occurs on the application side, the application owner needs to request the infrastructure owner to analyze the log on the virtualized infrastructure side in order to identify whether the cause of the failure is on the application side or the virtualized infrastructure side. Therefore, the workload of the infrastructure owner may increase.

On the other hand, when a failure occurs on the virtualized infrastructure side, the infrastructure owner needs to identify the range to be affected by the failure on applications. However, since the definitions of the logs are different between the organizations, the log analysis cannot be performed, thus it makes it difficult to indicate or clarify the problem to the application side.

As described above, when it takes longer to analyze logs and resolve the problems, a network failure time increases, and the network performance deteriorates.

Therefore, according to the present embodiment, the log management apparatus 150 automatically performs the primary analysis of logs when a failure occurs.

More specifically, the log management apparatus 150 searches, based on an error log on the application side, the database for a related error log on the virtualized infrastructure side using the log dictionary, and automatically determines whether the failure occurring in the application is due to a problem on the application side or there is a possibility of a problem on the virtualized infrastructure side. In this way, the problem when the application error occurs is automatically isolated therebetween.

Furthermore, the log management apparatus 150 searches, based on the error log on the virtualized infrastructure side, the database for the related error log on the application side using the log dictionary, and automatically identifies the application affected by the failure occurring in the virtualized infrastructure. In this way, the range to be affected by the failure is automatically identified when the virtualized infrastructure error occurs.

It should be noted that the log management apparatus 150 is not limited to the case of being an external function of the OSS/BSS 140 and the MANO 130 as illustrated in FIG. 2. The log management apparatus 150 may be provided inside the OSS/BSS 140 or may be provided inside the MANO 130. In this case, the log management function of the log management apparatus 150 is a part of the functions of the OSS/BSS 140 and the MANO 130.

Figure 3:
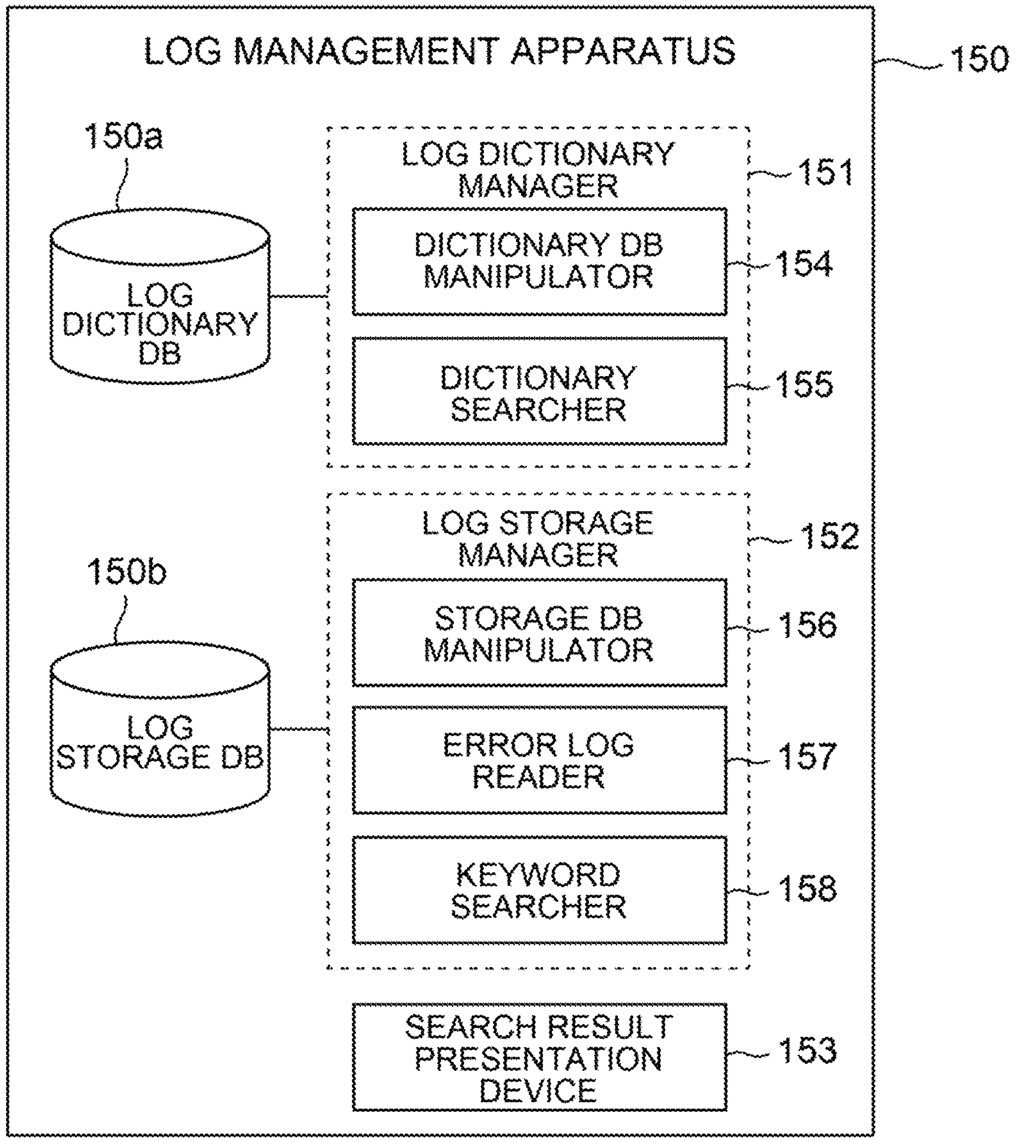
FIG. 3 is a functional block diagram of a log management apparatus.

FIG. 3 is a functional block diagram of the log management apparatus 150.

As illustrated in FIG. 3, the log management apparatus 150 includes a log dictionary manager 151, a log storage manager 152, and a search result presentation device 153. Furthermore, the log management apparatus 150 includes a log dictionary database (DB) **150*a* and a log storage database (DB) 150*b***.

The log dictionary database **150*a* stores correspondence information (e.g., log dictionary) in which, for each failure that may occur in the mobile network 100**, a keyword representing the contents of the error log of the virtualized infrastructure and a keyword representing the contents of the error log of the application related to the failure are associated with each other. Here, the keyword may be a simple word or a single sentence for an operator who is not familiar with log definitions or an operator who is not proficient in log analysis to easily understand the contents of the error log.

FIG. 4 is a diagram illustrating an exemplary configuration of the log dictionary database 150*a*. As illustrated in FIG. 4, the log dictionary database 150*a* is capable of storing a keyword representing the contents of the error log of the application (i.e., application keyword) and a keyword representing the contents of the error log of the virtualized infrastructure (i.e., infrastructure keyword) in association with each other. In addition, as illustrated in FIG. 4, the log dictionary database 150*a* may store detailed information (i.e., detailed description) of each of failures.

For example, the log dictionary database 150*a* may store a keyword of "memory error" on the application side and a keyword of "physical failure of memory" on the virtualized infrastructure side in association with each other.

When the error log corresponding to the application keyword "memory error" is observed on the application side, by performing dictionary search based on the application keyword "memory error", the infrastructure keyword of "physical failure of memory" is acquired. In this case, it may be presumed that the failure occurring on the application side may have occurred possibly due to a physical failure of the memory on the virtualized infrastructure side.

The log dictionary database 150*a* may register, in advance, an event (e.g., failure) known to occur in advance in a design phase of the system. In addition, the log dictionary database 150*a* may register an event when verifying the operation of the system in a staging environment (i.e., test environment). For example, when a failure occurs in the test environment, the infrastructure owner and the application owner verify the log on the virtualized infrastructure side and the log on the application side, respectively, and define and register the respective keywords corresponding to the occurred failure while cooperating with each other. Furthermore, the log dictionary database 150*a* may register (i.e., add) a failure occurred in an actual production environment (i.e., operation environment).

Referring back to FIG. 3, the log storage database 150*b* stores logs on the virtualized infrastructure side and logs on the application side together with the respective keywords. Such keywords correspond to the keywords registered in the log dictionary database 150*a*.

FIG. 5 is a diagram illustrating an exemplary configuration of the log storage database 150*b*. As illustrated in FIG. 5, the log storage database 150*b* stores the error log of each component in association with the keyword. Furthermore, as illustrated in FIG. 5, the log storage database 150*b* may store target component information (e.g., target application name, target infrastructure name) and log information (e.g., log type, log name). Yet furthermore, the log storage database 150*b* may store, in addition to the information illustrated in FIG. 5, information indicating a storage destination of the error log, for example.

It should be noted that, although the present embodiment will describe a certain case in which the log on the virtualized infrastructure side and the log on the application side are stored together in the log storage database 150*b*, there may be separate databases for storing the log on the virtualized infrastructure side and the log on the application side, respectively.

Referring back to FIG. 3, the log dictionary manager 151 includes a dictionary DB manipulator 154 and a dictionary searcher 155.

The dictionary DB manipulator 154 performs operations on the log dictionary database 150*a* based on commands or instructions from users. Here, the above user may be, for example, the infrastructure owner or the application owner. In addition, the above operations may include record registration in the dictionary, update of the dictionary, reference to the dictionary, and deletion in the dictionary.

Based on the keyword representing the contents of the error log of one (i.e., first component) of the virtualized infrastructure and the application, the dictionary searcher 155 searches for the keyword of the other component (i.e., second component) of the virtualized infrastructure and the application by referring to the log dictionary database 150*a*.

The log storage manager 152 includes a storage DB manipulator 156, an error log reader 157, and a keyword searcher 158.

The storage DB manipulator 156 performs operations on the log storage database 150*b* based on commands or instructions from users. Here, the above user may be, for example, the infrastructure owner or the application owner. In addition, the above operations may include record registration of a new log, reference to the log, and deletion of the log.

The error log reader 157 reads an error log to be analyzed and an associated keyword from the log storage database 150*b*.

Based on the keyword of the second component searched by the dictionary searcher 155, the keyword searcher 158 searches for the error log of the second component corresponding to the keyword, from the log stored in the log storage database 150*b*.

The search result presentation device 153 presents, to the user, the results of the search processing by the log dictionary manager 151 and the log storage manager 152.

It should be noted that the configuration of the functional blocks of the log management apparatus 150 illustrated in FIG. 3 is no more than an example, and a plurality of functional blocks may constitute one functional block, or any functional block may be divided into blocks performing a plurality of functions.

Furthermore, the plurality of functions of the log management apparatus 150 may be divided into the external functions of the OSS/BSS 140 and the MANO 130 of the network management system illustrated in FIG. 2, the internal function of the OSS/BSS 140, and the internal function of the MANO 130.

Hereinafter, an outline of manipulations on the log dictionary database 150*a* performed by the dictionary DB manipulator 154 will be described.

Figure 6:
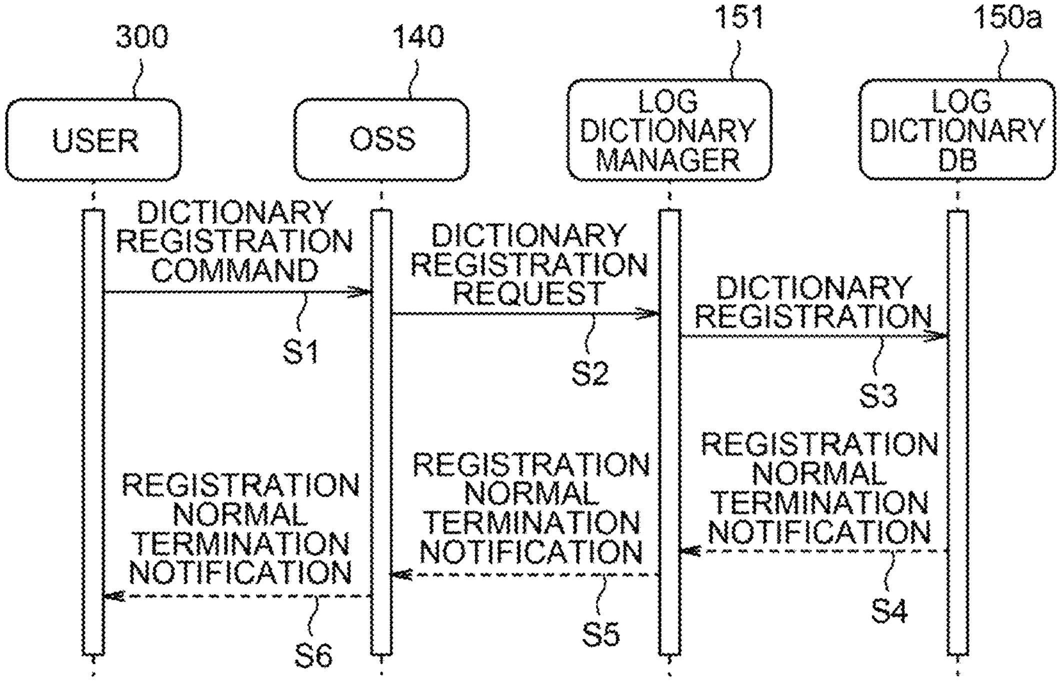
FIG. 6 is a sequence diagram illustrating an exemplary record registration operation in the dictionary.

FIG. 6 is a sequence diagram illustrating an exemplary record registration operation in the dictionary. The record registration operation is an operation of newly registering a record of the dictionary in the log dictionary database 150*a*.

First, in step S1, a user 300 transmits a dictionary registration command to the OSS 140. Here, the user 300 may be, for example, an application owner or an infrastructure owner. The dictionary registration command may include the number of records of a dictionary to be newly registered.

Upon receiving the dictionary registration command from the user 300, in step S2, the OSS 140 transmits a dictionary registration request to the log dictionary manager 151 based on the information included in the dictionary registration command.

In step S3, the log dictionary manager 151 receives the dictionary registration request from the OSS 140 and registers the record in the log dictionary database 150*a*. When the record is normally registered (in step S4), the log dictionary manager 151 transmits a registration normal termination notification of the dictionary to the user 300 via the OSS 140 (in steps S5 and S6).

Figure 7:
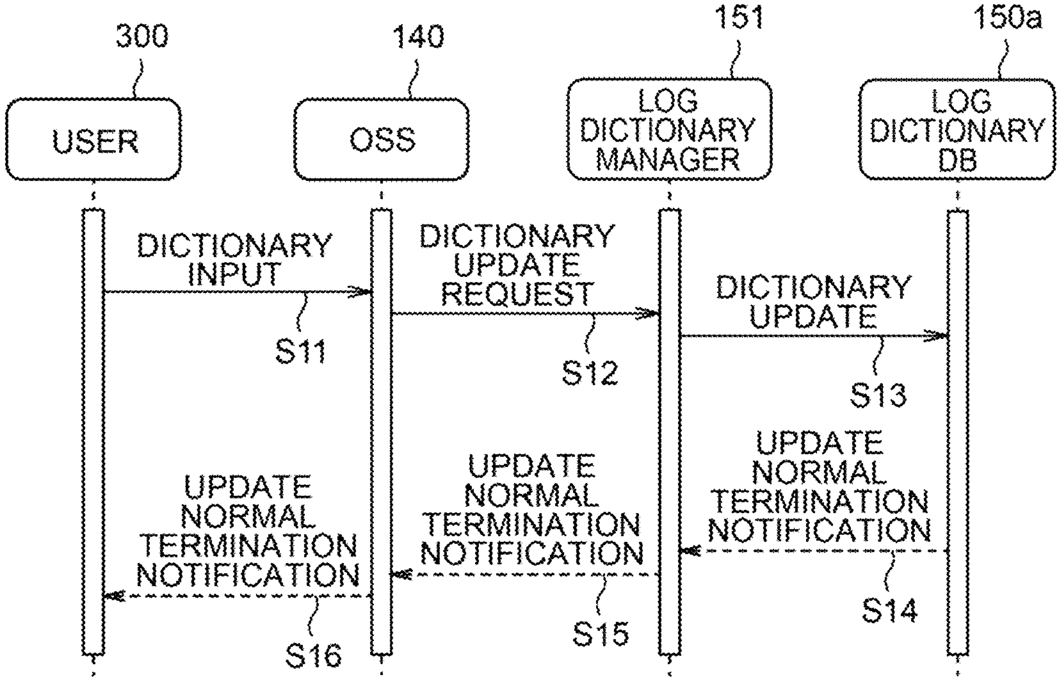
FIG. 7 is a sequence diagram illustrating an exemplary dictionary update operation.

FIG. 7 is a sequence diagram illustrating an exemplary dictionary update operation. The dictionary update operation is an operation of updating the contents of the record registered in the log dictionary database 150*a*.

First, in step S11, the user 300 performs dictionary input to the OSS 140. Here, the input information input by the user 300 is information to be recorded in the record registered in the log dictionary database 150*a*, and may include the application keyword, the infrastructure keyword, and the detailed description of the failure as illustrated in FIG. 4.

Upon receiving the dictionary input from the user 300, in step S12, the OSS 140 transmits a dictionary update request to the log dictionary manager 151 based on the input information.

In step S13, the log dictionary manager 151 receives the dictionary update request from the OSS 140, and updates the record of the dictionary in the log dictionary database 150*a*. When the record is normally updated (in step S14), the log dictionary manager 151 transmits an update normal termination notification of the dictionary to the user 300 via the OSS 140 (in steps S15 and S16).

Figure 8:
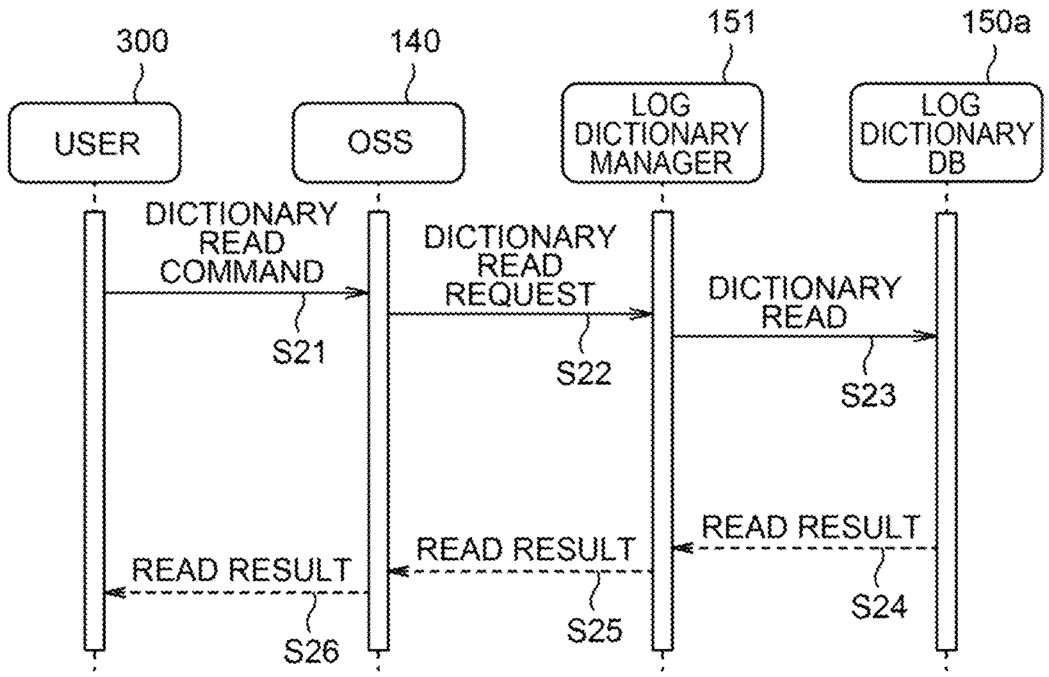
FIG. 8 is a sequence diagram illustrating an exemplary dictionary reference operation.

FIG. 8 is a sequence diagram illustrating an exemplary dictionary reference operation. The dictionary reference operation is an operation of referring to the contents of the record registered in the log dictionary database 150*a*.

First, in step S21, the user 300 transmits a dictionary read command to the OSS 140. Here, the dictionary read command may include information that can identify a record to be read, such as a keyword or a record number registered in the dictionary.

Upon receiving the dictionary read command from the user 300, in step S22, the OSS 140 transmits a dictionary read request to the log dictionary manager 151 based on the information included in the dictionary read command.

In step S23, the log dictionary manager 151 receives the dictionary read request from the OSS 140, and reads the target record from the log dictionary database 150*a*. When the record is normally read (in step S24), the log dictionary manager 151 transmits the read result to the user 300 via the OSS 140 (in steps S25 and S26).

Figure 9:
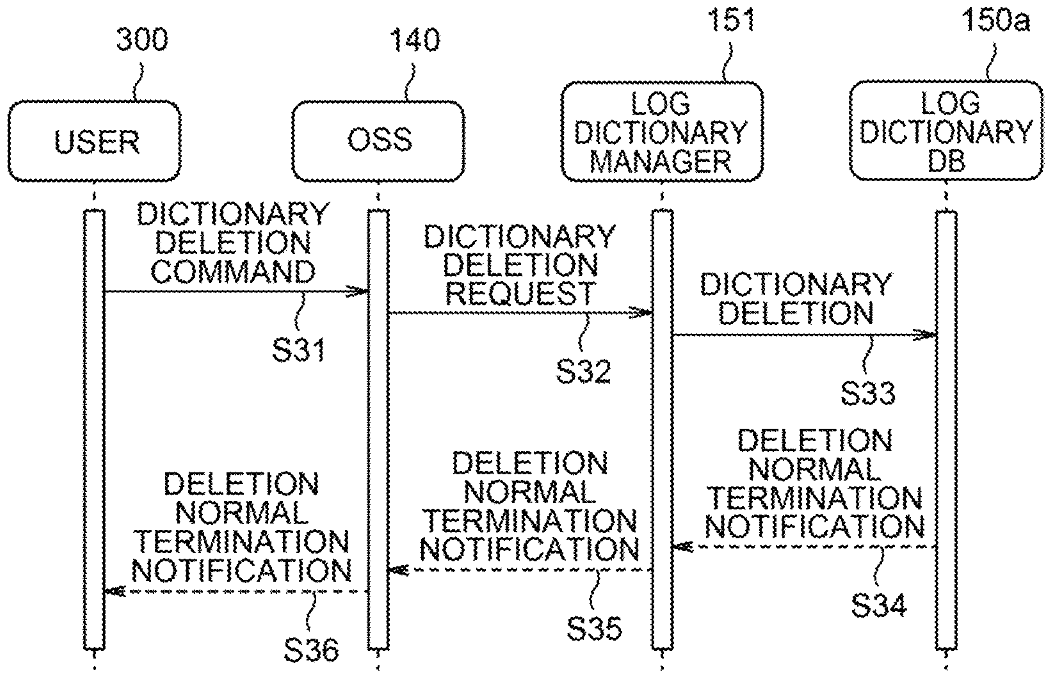
FIG. 9 is a sequence diagram illustrating an exemplary dictionary deletion operation.

FIG. 9 is a sequence diagram illustrating an exemplary dictionary deletion operation. The dictionary deletion operation is an operation of deleting the record registered in the log dictionary database 150*a*.

First, in step S31, the user 300 transmits a dictionary deletion command to the OSS 140. Here, the dictionary deletion command may include information that can identify a record to be deleted, such as a keyword or a record number registered in the dictionary.

Upon receiving the dictionary deletion command from the user 300, in step S32, the OSS 140 transmits a dictionary deletion request to the log dictionary manager 151 based on the information included in the dictionary deletion command.

In step S33, the log dictionary manager 151 receives the dictionary deletion request from the OSS 140, and deletes the target record from the log dictionary database 150*a*. When the record is normally deleted (in step S34), the log dictionary manager 151 transmits a deletion normal termination notification of the dictionary to the user 300 via the OSS 140 (in steps S35 and S36).

Next, an outline of manipulations on the log storage DB 150*b* performed by the storage DB manipulator 156 will be described.

Figure 10:
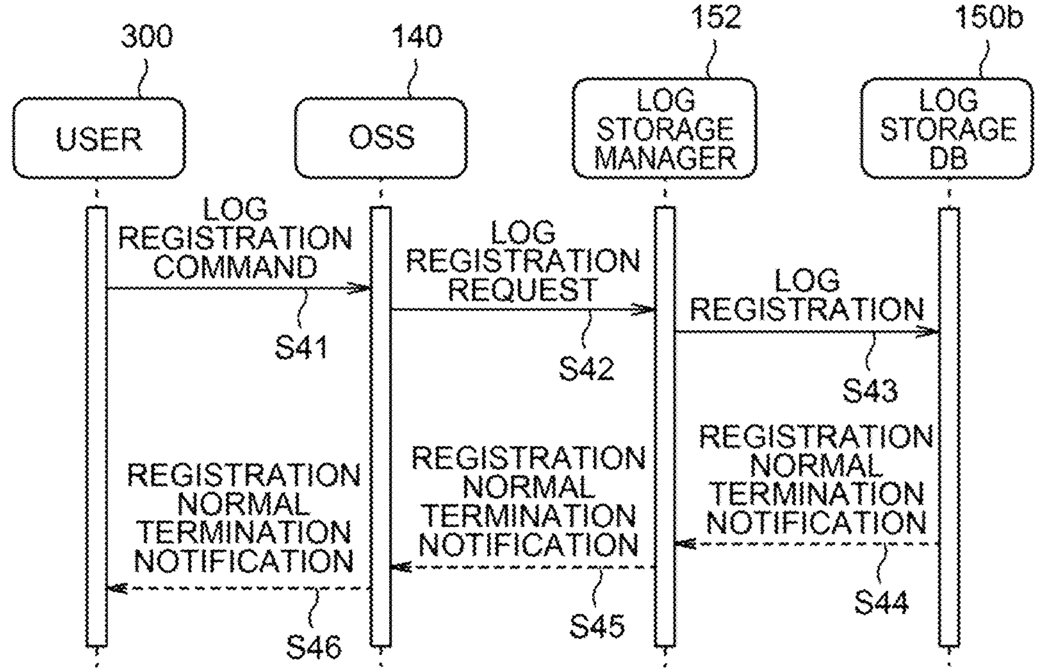
FIG. 10 is a sequence diagram illustrating an exemplary record registration operation of a new log.

FIG. 10 is a sequence diagram illustrating an exemplary record registration operation of a new log. The basic operation is similar to the record registration operation of the dictionary illustrated in FIG. 6.

First, in step S41, a user 300 transmits a log registration command to the OSS 140. The log registration command may include the number of records of a log to be newly registered. Furthermore, the log registration command may include information of the target component, log information, and a keyword of an error log as illustrated in FIG. 5.

Upon receiving the log registration command from the user 300, in step S42, the OSS 140 transmits a log registration request to the log storage manager 152 based on the information included in the log registration command.

In step S43, the log storage manager 152 receives the log registration request from the OSS 140, and registers a record of the new log in the log storage database 150*b*. When the record of the new log is normally registered (in step S44), the log storage manager 152 transmits a registration normal termination notification of the log to the user 300 via the OSS 140 (in steps S45 and S46).

Figure 11:
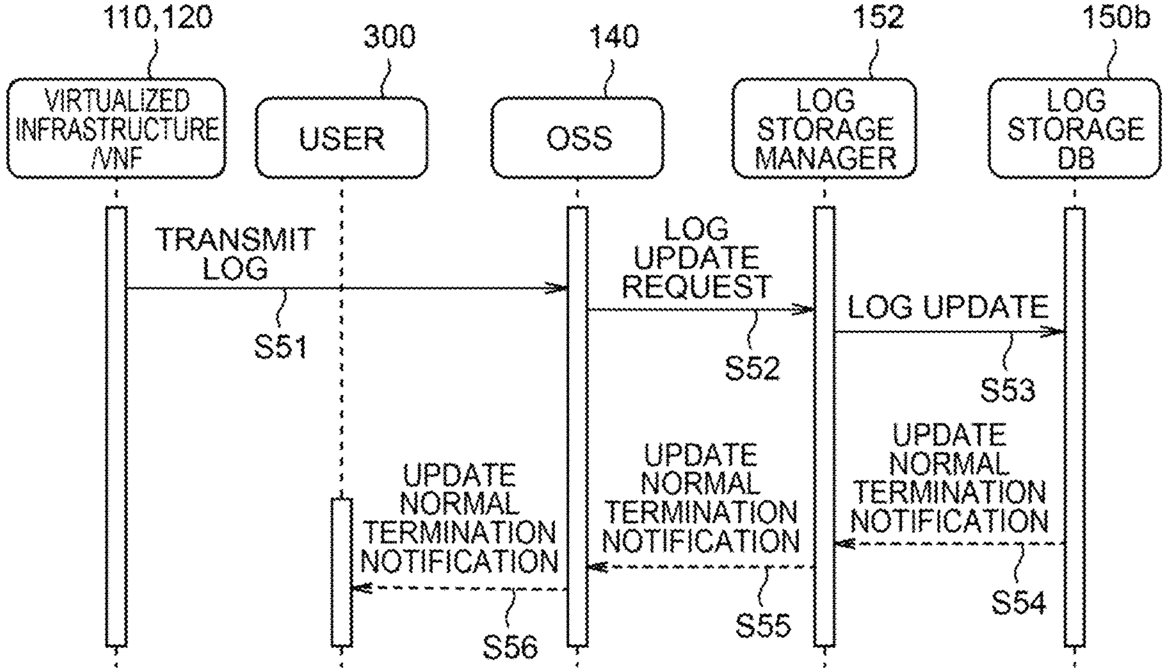
FIG. 11 is a sequence diagram illustrating an exemplary log update operation.

FIG. 11 is a sequence diagram illustrating an exemplary log update operation.

The logs to be stored in the log storage database 150*b* are periodically transmitted from the virtualized infrastructure (NFVI 110) and the VNF 120 to the OSS 140 (in step S51).

Upon receiving the log, in step S52, the OSS 140 transmits a log update request to the log storage manager 152.

In step S53, the log storage manager 152 receives the log update request from the OSS 140, and updates the logs in the log storage database 150*b*. When the log is normally updated (in step S54), the log storage manager 152 transmits an update normal termination notification of the log to the user 300 via the OSS 140 (in steps S55 and S56).

It should be noted that, although the sequence diagram illustrated in FIG. 11 illustrates a certain specification of transmitting the log from the virtualized infrastructure and the VNF to the log storage manager 152 via the OSS 140, another specification is possible to directly transmit the log from the virtualized infrastructure and the VNF to the log storage manager 152.

Furthermore, the log to be transmitted to the log storage manager 152 is not limited to the log transmitted from the virtualized infrastructure and the VNF. For example, the log may be transmitted from a certain management apparatus (not illustrated) that performs alive-monitoring of the virtualized infrastructure and the VNF to the log storage manager 152, via the OSS 140 or directly.

Figure 12:
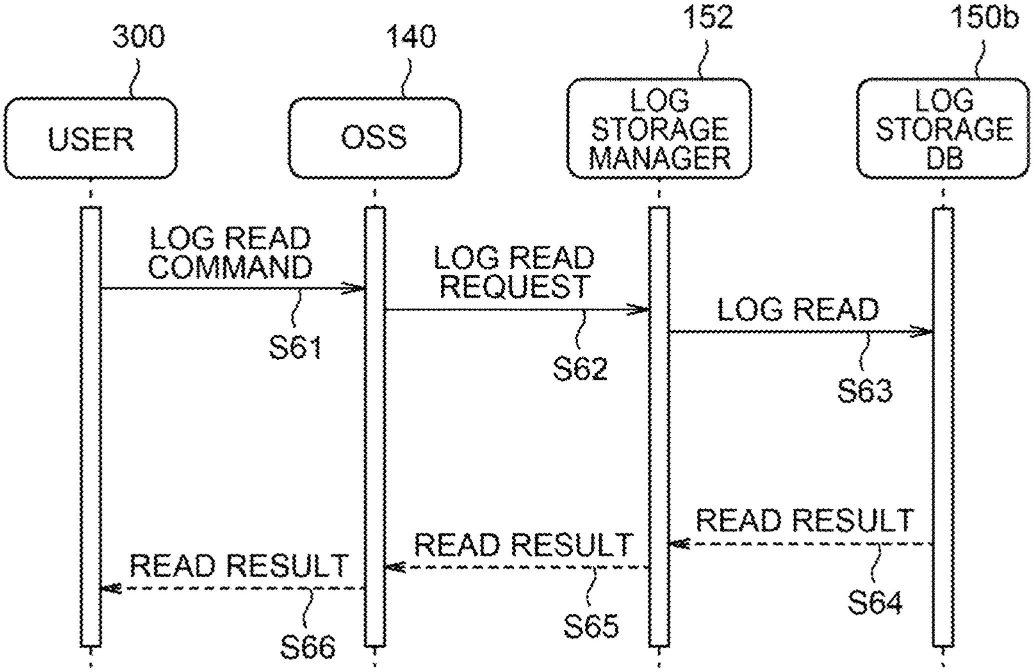
FIG. 12 is a sequence diagram illustrating an exemplary log reference operation.

FIG. 12 is a sequence diagram illustrating an exemplary log reference operation. The basic operation is similar to the dictionary reference operation illustrated in FIG. 8.

First, in step S61, a user 300 transmits a log read command to the OSS 140. Here, the log read command may include information that can identify a log to be read.

Upon receiving the log read command from the user 300, in step S62, the OSS 140 transmits a log read request to the log storage manager 152 based on the information included in the log read command.

In step S63, the log storage manager 152 receives the log read request from the OSS 140, and reads the target log from the log storage database 150*b*. When the log is normally read (in step S64), the log storage manager 152 transmits the read result to the user 300 via the OSS 140 (in steps S65 and S66).

Figure 13:
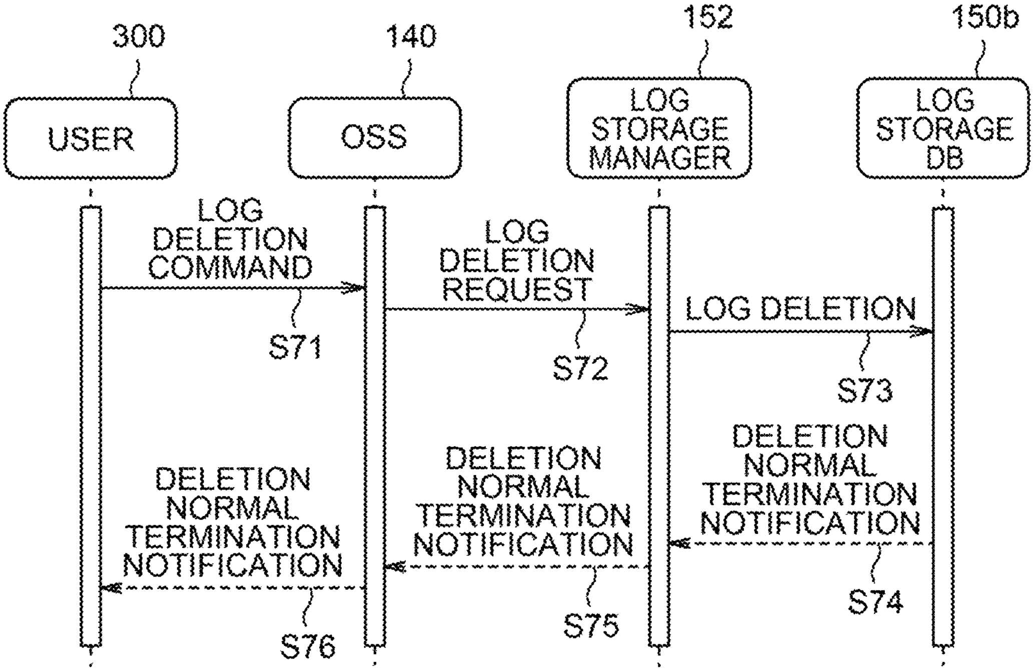
FIG. 13 is a sequence diagram illustrating an exemplary log deletion operation.

FIG. 13 is a sequence diagram illustrating an exemplary log deletion operation. The basic operation is similar to the dictionary deletion operation illustrated in FIG. 9.

First, in step S71, a user 300 transmits a log deletion command to the OSS 140. Here, the log deletion command may include information that can identify a log to be deleted.

Upon receiving the log deletion command from the user 300, in step S72, the OSS 140 transmits a log deletion request to the log storage manager 152 based on the information included in the log deletion command.

In step S73, the log storage manager 152 receives the log deletion request from the OSS 140, and deletes the target log from the log storage database 150*b*. When the log is normally deleted (in step S74), the log storage manager 152 transmits a deletion normal termination notification of the log to the user 300 via the OSS 140 (in steps S75 and S76).

Figure 14:
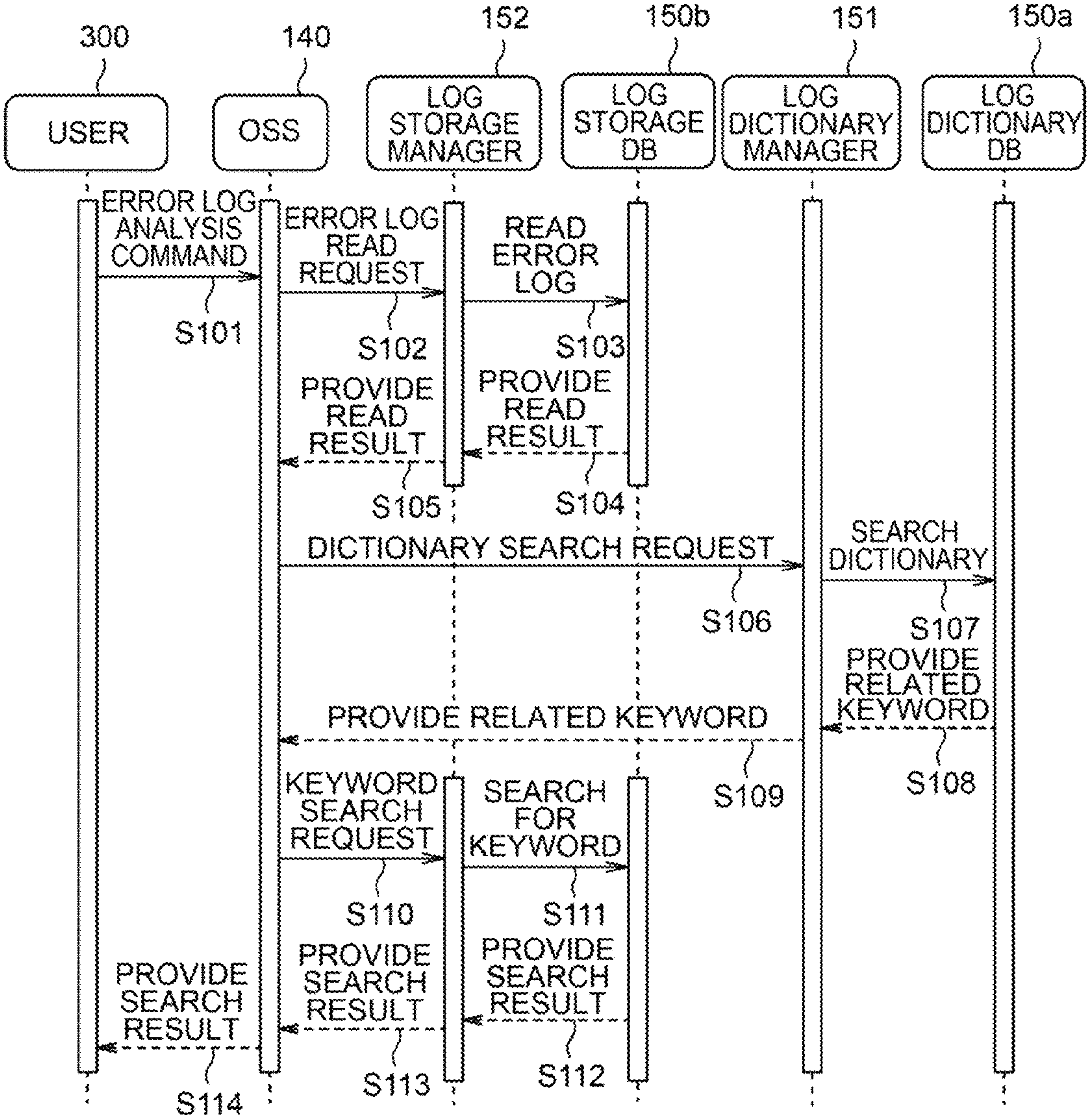
FIG. 14 is a sequence diagram illustrating an exemplary log analysis operation.

FIG. 14 is a sequence diagram illustrating an exemplary log analysis operation. The log analysis operation may be performed when a failure occurs in the mobile network 100.

First, in step S101, a user 300 transmits an error log analysis command to the OSS 140. Here, the user 300 may be, for example, an application owner or an infrastructure owner. In the following description, a certain case will be described in which the user 300 is the application owner. The error log analysis command may include information that can identify the log to be analyzed, such as an application name and a log name.

Upon receiving the error log analysis command from the user 300, in step S102, the OSS 140 transmits an error log read request to the log storage manager 152.

In step S103, the log storage manager 152 receives the error log read request from the OSS 140, and reads the target error log and a keyword of the error log (i.e., target keyword) from the log storage database 150*b*. The read result is provided from the log storage manager 152 to the OSS 140 (in steps S104 and S105).

Next, in step S106, the OSS 140 transmits a dictionary search request of the error log to the log dictionary manager 151. The dictionary search request includes the target keyword included in the read result.

In step S107, the log dictionary manager 151 refers to the log dictionary database 150*a* based on the target keyword included in the dictionary search request, and searches for a keyword associated with the target keyword (i.e., related keyword). The related keyword is an error keyword of the virtualized infrastructure that is related to the error of the application concerned. Furthermore, in step S107, the log dictionary manager 151 may refer to the log dictionary database 150*a* to acquire the detailed information of the failure associated with the target keyword. The searched related keyword and detailed information of the failure are provided from the log dictionary manager 151 to the OSS 140 (in steps S108 and S109).

Subsequently, in step S110, the OSS 140 transmits a keyword search request to the log storage manager 152. The keyword search request includes the related keyword provided from the log dictionary manager 151.

In step S111, the log storage manager 152 searches for an error log of the virtualized infrastructure from the logs stored in the log storage database 150*b* based on the related keyword included in the keyword search request from the OSS 140. A search result is provided from the log storage manager 152 to the user 300 via the OSS 140 (in steps S112 to S114).

For example, when the error log of the virtualized infrastructure associated with the related keyword is hit in the keyword search in step S111 described above, such a virtualized infrastructure is presented to the user 300 as a candidate for the cause of the error of the application concerned.

As described above, when the user 300 is the application owner, the log analysis operation illustrated in FIG. 14 is an operation of performing dictionary search based on the error log of the application, searching for the related error log on the virtualized infrastructure side, and automatically determining the candidate for the cause of the failure.

For example, it is assumed that an error occurs in an application (APP1) and an error log of "ERR:aaaa" is output. In this case, upon receiving an error log analysis command of the application "APP1" from the application owner, the log storage manager 152 reads the error log "ERR:aaaa" and a keyword "KEY_1" from the log storage database 150*b* as illustrated in FIG. 5 (in steps S101 to S105 in FIG. 14).

Subsequently, the log dictionary manager 151 searches the log dictionary database 150*a* illustrated in FIG. 4 based on the keyword "KEY_1", and acquires "KEY_A", "KEY_B", and "KEY_C" as the keywords of the related virtualized infrastructure error log (in steps S106 to S109 in FIG. 14).

Subsequently, based on the searched related keywords "KEY_A", "KEY_B", and "KEY_C", the log storage manager 152 searches the log storage database 150*b* illustrated in FIG. 5 for the error log of SERVER 1 corresponding to the related keywords (in steps S110 to 112 in FIG. 14). Yet subsequently, when the error log is searched, the log storage manager 152 presents the searched virtualized infrastructure (SERVER 1) to the user as a candidate for the cause of the failure (in steps S113 and S114 in FIG. 14).

Figure 15:
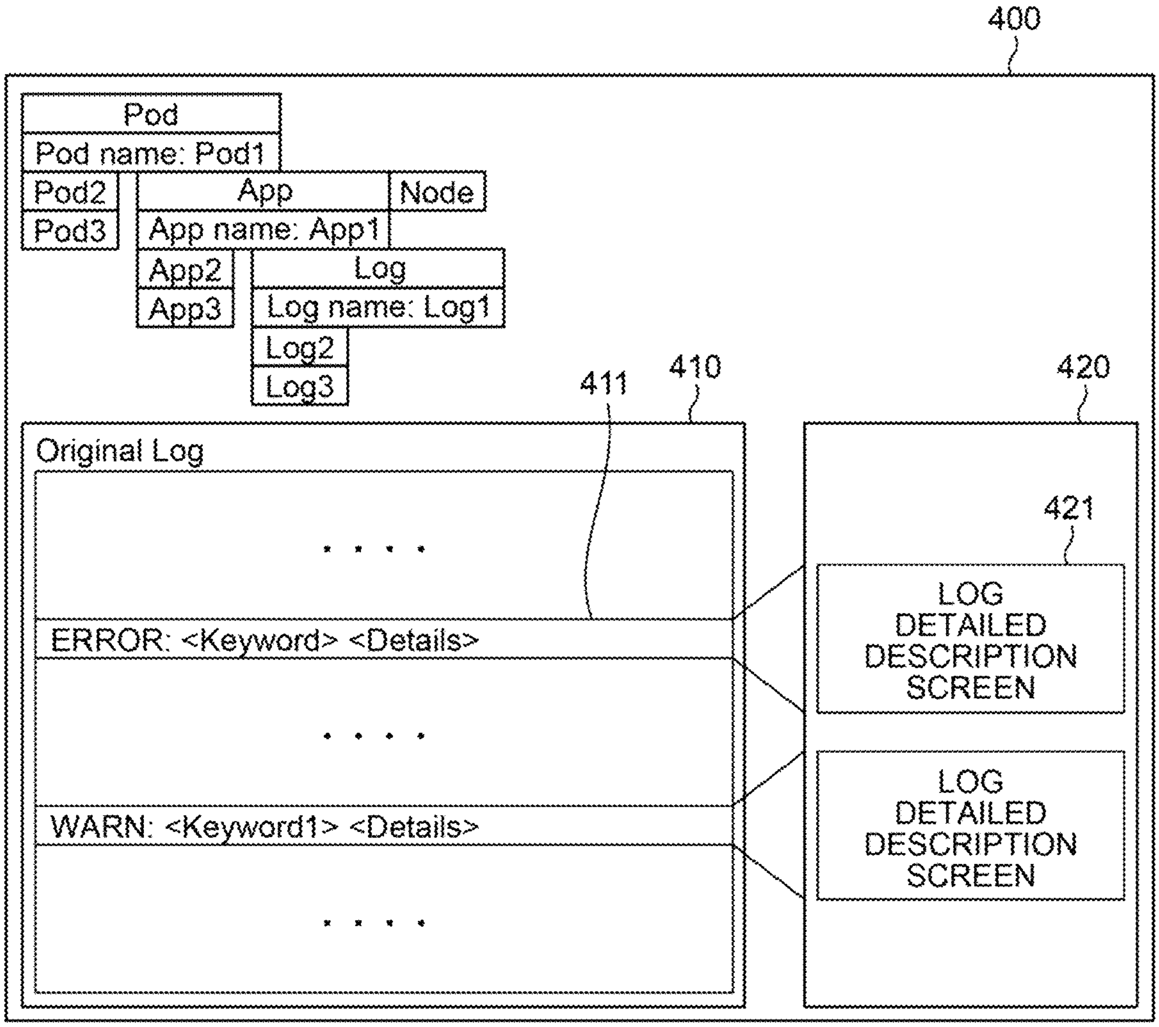
FIG. 15 is a diagram illustrating an example of a log reference screen of an application.

FIG. 15 illustrates an example of a log reference screen of the application.

The application owner can confirm the result of the dictionary search or the like from, for example, the log reference screen 400 illustrated in FIG. 15.

The log reference screen 400 may include, for example, a log display area 410 for displaying an original log and a detailed display area 420 for displaying detailed information of the error log. On the log reference screen 400, the log can be referred for each pod and each application, for example. In the log display area 410, an error log 411 may be highlighted. Furthermore, in the detailed display area 420, a log detailed description screen 421 corresponding to each error log 411 may be displayed.

Figure 16:
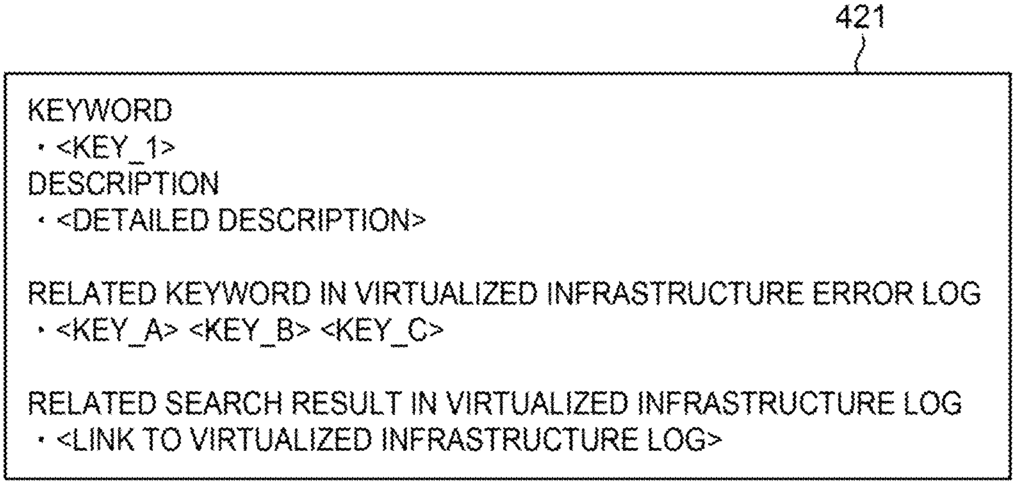
FIG. 16 is a diagram illustrating an example of a log detailed description screen of the application.

FIG. 16 illustrates an example of the log detailed description screen 421.

As illustrated in FIG. 16, a keyword of the application error log (for example, KEY_1) may be displayed on the log detailed description screen 421. The keyword is the target keyword read from the log storage database 150*b* in step S103 of FIG. 14.

Furthermore, a description of the application error and a keyword (for example, KEY_A, KEY_B, or KEY_C) of the virtualized infrastructure error log related to the application error may be displayed on the log detailed description screen 421. The above description and keyword are the detailed information and the related keyword searched from the log dictionary database 150*a* in step S107 of FIG. 14.

Yet furthermore, a link to the virtualized infrastructure log related to the application error may be displayed on the log detailed description screen 421. The link is a link for guiding to the storage destination of the error log searched from the log storage database 150*b* in step S111 of FIG. 14.

As a result, the application owner can easily confirm the candidate for the cause of the application error.

On the other hand, when an error occurs in an application (APP2) and an error log of "ERR:bbbb" is output, upon receiving an error log analysis command of the application "APP2" from the application owner, the log storage manager 152 reads a keyword "KEY_2" of the error log "ERR:bbbb" from the log storage database 150*b* as illustrated in FIG. 5 (in steps S101 to S105 in FIG. 14). Subsequently, the log dictionary manager 151 searches the log dictionary database 150*a* illustrated in FIG. 4 based on the keyword "KEY_2", and confirms that the keyword of the related virtualized infrastructure error log is not registered (in steps S106 to S109 in FIG. 14).

In this case, the application owner is notified that there is no related keyword. In other words, in the log detailed description screen 421 illustrated in FIG. 16, a keyword field of the related virtualized infrastructure error log is made blank. Therefore, the application owner can determine that the cause of the failure does not exist on the virtualized infrastructure side, in other words, the failure is occurring due to the problem on the application side.

Furthermore, when the user 300 is the infrastructure owner, the log analysis operation illustrated in FIG. 14 is an operation of performing dictionary search based on the error log of the virtualized infrastructure, searching for the related error log on the application side, and automatically determining the range to be affected by the virtualized infrastructure failure.

For example, it is assumed that an error occurs in the virtualized infrastructure (SERVER1) and an error log of "ERR:cccc" is output. In this case, when receiving an error log analysis command of the virtualized infrastructure "SERVER1" from the infrastructure owner, the log storage manager 152 reads the error log "ERR:cccc" and a keyword "KEY_A" from the log storage database 150*b* as illustrated in FIG. 5 (in steps S101 to S105 in FIG. 14).

Subsequently, the log dictionary manager 151 searches the log dictionary database 150*a* illustrated in FIG. 4 based on the keyword "KEY_A", and acquires "KEY_1" as the keyword of the related application error log (in steps S106 to S109 in FIG. 14).

Subsequently, based on the searched related keyword "KEY_1", the log storage manager 152 searches the log storage database 150*b* illustrated in FIG. 5 for the error log of APP1 corresponding to the related keyword (in steps S110 to 112 in FIG. 14). Yet subsequently, when the error log is searched, the log storage manager 152 presents the searched application (APP1) to the user as an application being affected by the virtualized infrastructure failure (in steps S113 and S114 in FIG. 14).

Figure 17:
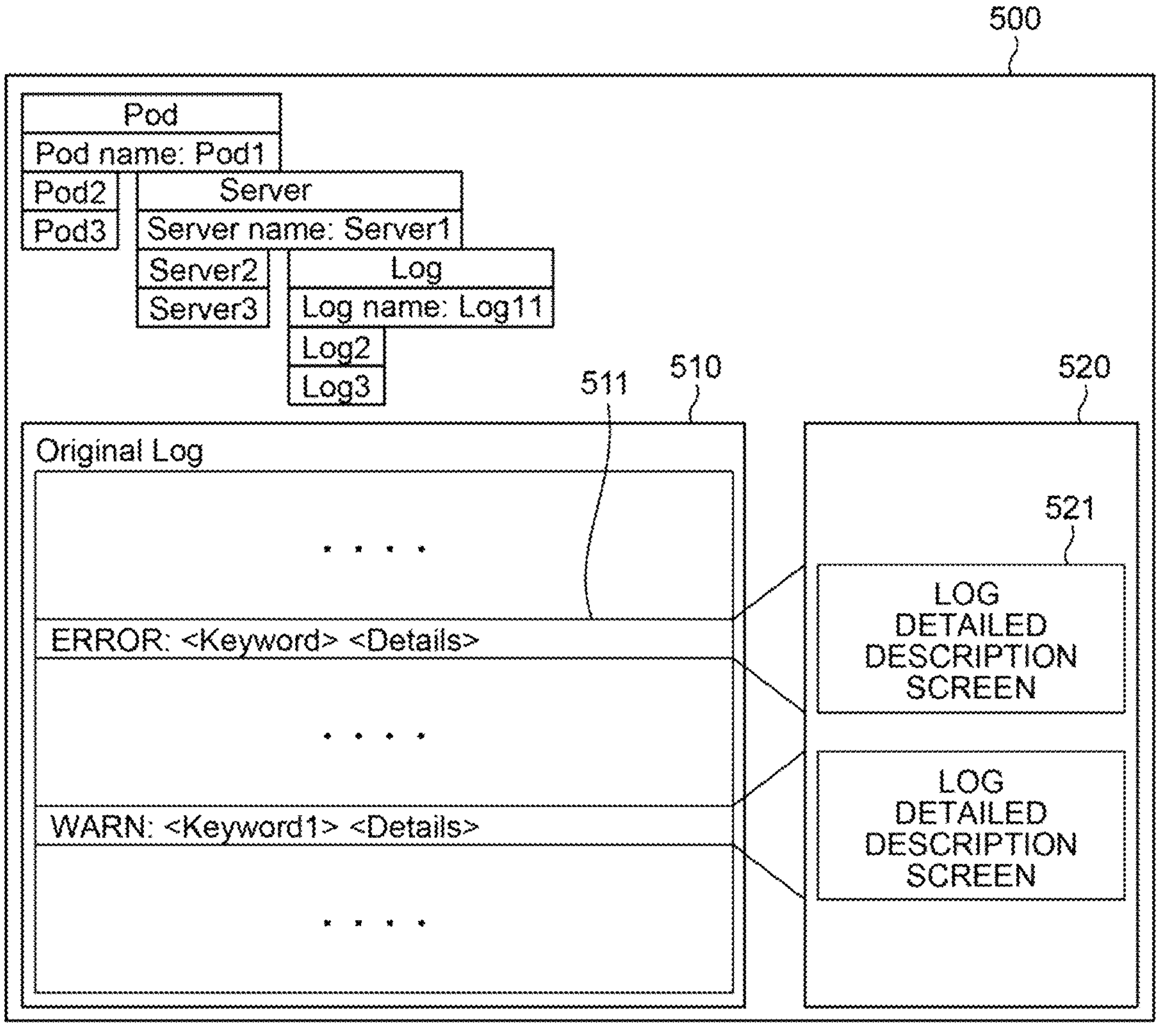
FIG. 17 is a diagram illustrating an example of a log reference screen of a virtualized infrastructure.

FIG. 17 is an example of a log reference screen of the virtualized infrastructure.

The infrastructure owner can confirm, for example, the result of the dictionary search or the like from a log reference screen 500 illustrated in FIG. 17.

The log reference screen 500 may include a log display area 510 and a detailed display area 520, similarly to the log reference screen 400 of the application illustrated in FIG. 15. On the log reference screen 500, the log can be referred for each pod and each server, for example. In the log display area 510, an error log 511 may be highlighted. Furthermore, in the detailed display area 520, a log detailed description screen 521 corresponding to each error log 511 may be displayed.

Figure 18:
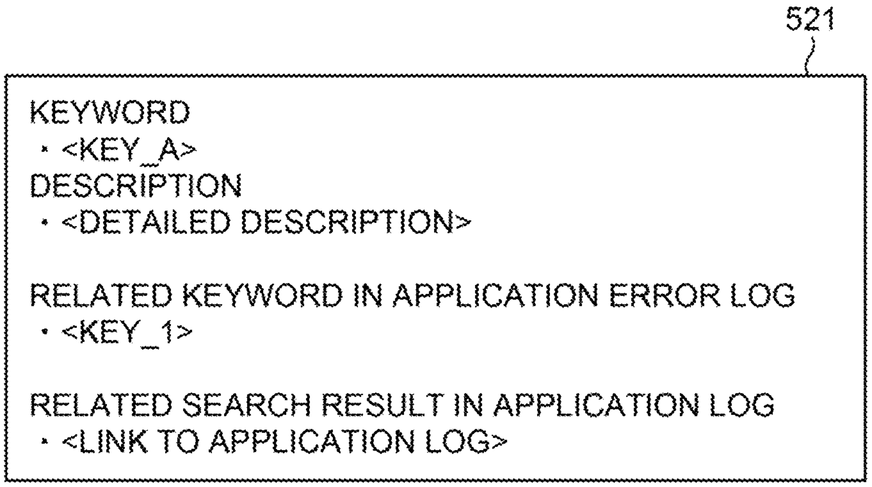
FIG. 18 is a diagram illustrating an example of a log detailed description screen of the virtualized infrastructure.

FIG. 18 is an example of the log detailed description screen 521.

Similarly to the log detailed description screen 421 of the application illustrated in FIG. 16, the log detailed description screen 521 may display the keyword of the virtualized infrastructure error log, the description of the virtualized infrastructure error, the keyword of the application error log related to the virtualized infrastructure error, and a link to the application log related to the virtualized infrastructure error.

As a result, the infrastructure owner can easily confirm the range to be affected by the virtualized infrastructure error on the application.

As described above, the log management apparatus 150, which is the network management apparatus according to the present embodiment, includes the log storage database 150*b* and stores logs of a plurality of components constituting the virtualization environment in the mobile network 100. Furthermore, the log management apparatus 150 includes the log dictionary database 150*a*, and stores the correspondence information (i.e., log dictionary) in which, for each failure that may occur in the mobile network 100, error logs of the plurality of components related to the failure are associated with each other.

Then, when a failure occurs in the mobile network 100, the log management apparatus 150 searches, based on an error log of a first component among the plurality of components, for an error log of a second component related to the failure occurred, from the logs stored in the log storage database 150*b* using the correspondence information stored in the log dictionary database 150*a*, and presents a result of the search to the user 300. Here, the plurality of components may include a virtualized infrastructure and an application on the virtualized infrastructure.

As described above, the log management apparatus 150 according to the present embodiment stores the error log of the virtualized infrastructure and the error log of the application in association with each other, and when an error occurs in the application, the log management apparatus 150 is able to search for an error log of the virtualized infrastructure related to the error concerned and present the result to the user (i.e., application owner) 300. Similarly, when an error occurs in the virtualized infrastructure, the log management apparatus 150 is able to search for an error log of an application related to the error and present the result to the user (i.e., infrastructure owner) 300.

As a result, when a failure occurs in the application, the application owner can easily confirm whether an error log related to the failure concerned is also output on the virtualized infrastructure side. Therefore, it makes it possible for the application owner to easily determine whether the failure that has occurred in the application is due to a problem on the application side or there is a possibility of a problem on the virtualized infrastructure side.

On the other hand, when a failure occurs in the virtualized infrastructure, the infrastructure owner can easily confirm whether an error log related to the failure concerned is also output on the application side. Therefore, it makes it possible for the infrastructure owner to easily recognize whether the failure that has occurred in the virtualized infrastructure affects the application.

Accordingly, even in an environment where respective owners cannot refer to each other's log or in a case where the definition of the logs of respective components differ depending on developers, it makes it possible to promptly and appropriately perform failure detection to primary isolation of the cause of the failure and identification of the range to be affected by the failure concerned.

More specifically, in a case where the first component is an application and the second component is a virtualized infrastructure, when the error log of the virtualized infrastructure related to the failure of the application is searched from the log stored in the log storage database 150*b*, the log management apparatus 150 is able to present the virtualized infrastructure concerned as a candidate for the cause of the failure of the application.

In this case, the application owner is able to request the infrastructure owner in charge of the virtualized infrastructure, which is a candidate for the cause of the failure, to perform the cause analysis and the recovery operation. As described above, it makes it possible to request the necessary operation from the application owner to the infrastructure owner after appropriately isolating the problems, thereby minimizing the operational load of the infrastructure owner.

On the other hand, when the error log of the virtualized infrastructure related to the failure of the application is not searched from the logs stored in the log storage database 150*b*, the log management apparatus 150 is able to present the application itself as the cause of the failure.

In this case, the application owner is able to promptly start operations such as debugging, thereby shortening the time to resolve the problem.

Furthermore, in a case where the first component is the virtualized infrastructure and the second component is the application, when an error log of the application related to a failure of the virtualized infrastructure is searched from the logs stored in the log storage database 150*b*, the log management apparatus 150 is able to present the application concerned as the range to be affected by the failure.

In this case, the infrastructure owner is able to appropriately identify which application is affected by the failure that has occurred in the virtualized infrastructure. Therefore, the infrastructure owner is able to appropriately notify the application owner, who is in charge of the application affected by the failure, of the handling status and the like of the failure concerned.

As described above, when a failure occurs, the infrastructure owner and the application owner can share the same recognition of the problem and quickly resolve the problem while cooperating with each other.

In addition, as illustrated in FIG. 4, the log management apparatus 150 according to the present embodiment is able to store keywords representing the contents of error logs of a plurality of components in association with each other in the log dictionary database 150*a*. In this case, the log management apparatus 150 is able to search, based on the keyword of the error log of the first component, for the keyword (i.e., related keyword) of the error log of the second component with reference to the correspondence information stored in the log dictionary database 150*a*, and search the error log of the second component from the logs stored in the log storage database 150*b* based on the searched related keyword.

As described above, by performing the search processing using the keywords, it makes it possible to easily search for the related keyword and search for the related error log.

In addition, the log management apparatus 150 may present the keyword of the error log of the first component and the keyword of the error log of the second component to the user 300 as a result of the search. As a result, the user 300 is able to easily recognize the contents of a failure occurring in the first component and the contents of the error of the second component related to the failure concerned.

Furthermore, the log management apparatus 150 may present a link to the error log of the second component searched from the logs stored in the log storage database 150*b* to the user 300 as a result of the search. As a result, the user 300 is able to easily access the error log of the second component related to the failure occurring in the first component and confirm the contents thereof.

As described above, according to the present embodiment, it makes it possible to promptly perform the primary analysis of the log when the failure occurs in the virtualization environment. As a result, it makes it possible to shorten the time from the occurrence of the failure to the recovery of the system, thereby shortening the network failure time imposed to the user using the mobile network 100 so as to improve the performance in the mobile network 100.

The network management apparatus according to the present embodiment may be implemented in any general-purpose server(s) constituting a backhaul network, a core network, or the like of the mobile network 100. It should be noted that the network management apparatus may be implemented in a dedicated server. Furthermore, the network management apparatus may be implemented on a single computer or a plurality of computers or any other processing platform.

Figure 19:
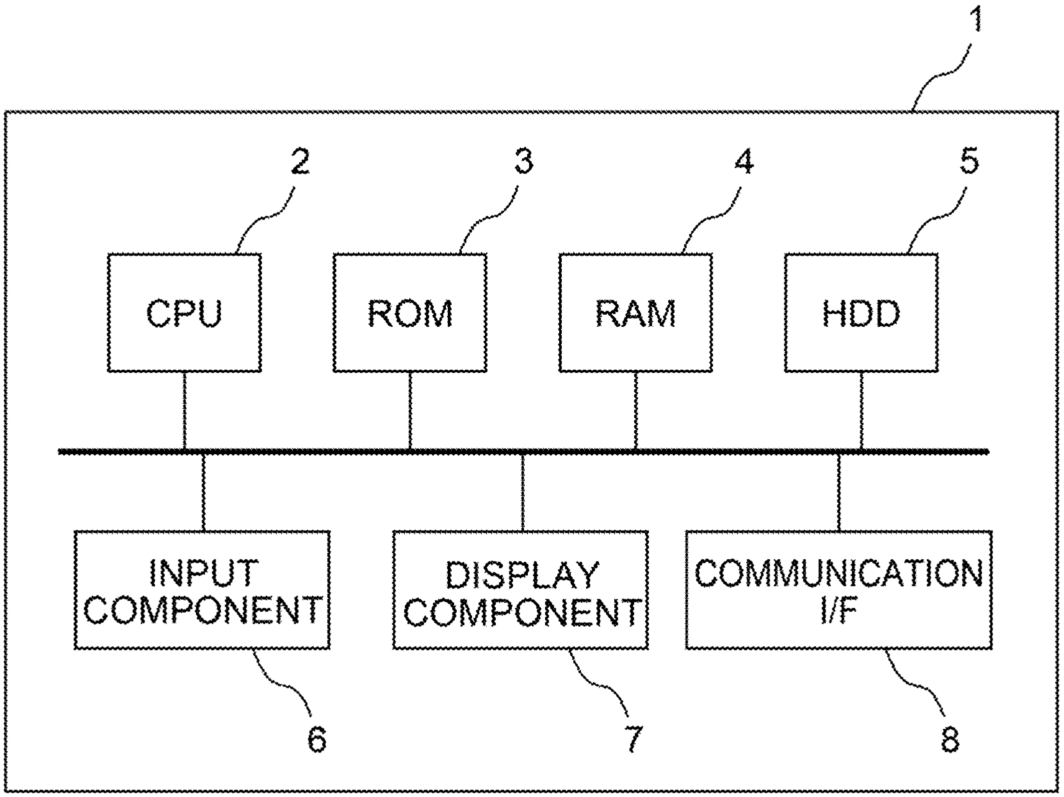
FIG. 19 is a block diagram illustrating an exemplary hardware configuration of the network management apparatus.

FIG. 19 illustrates a non-limiting example of a hardware configuration of an embodiment of the network management apparatus 1 according to the present disclosure. As shown in FIG. 19, the network management apparatus 1 includes processor (CPU 2 in FIG. 19), a memory (ROM 3 and RAM 4 in FIG. 19), a storage component (HDD 5 in FIG. 19), an input component 6, an output component (display component 7 in FIG. 19), a communication interface 8, and a bus.

The processor, as used herein, means any type of computational circuit that may comprise hardware elements and software elements. The processor may be embodied as a multi-core processor, a single core processor, or a combination of one or more multi-core processors and/or one or more single core processors, a distributed processing system, or the like. The processor may be a Central Processing Unit (CPU), a Graphics Processing Unit (GPU), an Accelerated Processing Unit (APU), an Application-Specific Integrated Circuit (ASIC), or another type of processing component.

The memory includes a non-transitory computer readable medium. The memory includes a random-access memory (RAM), a read only memory (ROM), and/or another type of dynamic or static storage device (e.g., a flash memory, a magnetic memory, and/or an optical memory) that stores information and/or instructions for use by the processor. The memory comprises machine-readable instructions which are executable by the processor. These machine-readable instructions when executed by the processor cause the processor to perform one or more method steps of an embodiment described above.

The storage component stores information and/or software related to the operation and use of the network management apparatus 1. For example, the storage component may include a hard disk (e.g., a magnetic disk, an optical disk, a magneto-optic disk, and/or a solid-state disk), a Compact Disc (CD), a Digital Versatile Disc (DVD), a floppy disk, a cartridge, a magnetic tape, and/or another type of non-transitory computer-readable medium, along with a corresponding drive.

The input component 6 is configured to receive information, such as user input. For example, the input component 6 may include, but not be limited to, a touch screen display, a keyboard, a keypad, a mouse, a button, a switch, and/or a microphone. Additionally, or alternatively, the input component 6 may include a sensor for sensing information (e.g., a global positioning system (GPS), an accelerometer, a gyroscope, and/or an actuator).

The output component is configured to provide output information from the network management apparatus 1. For example, the output component may be, but not limited to, a display, a speaker, an instruction device to an external device, and/or one or more light-emitting diodes (LEDs).

The communication interface (I/F) 8 is an interface that provides a communication connection to other devices, such as external devices and internal devices. The connection by the communication interface 8 can be a wired connection, a wireless connection, or a combination of wired and wireless connections, and can be a direct connection or an indirect connection via a communication network that exists between the network management apparatus 1 and other devices. In other words, the standard of the communication interface 8 is not limited.

The bus acts as an interconnect between the processor, the memory, the storage component, the input component 6, the output component 7, and the communication interface 8 of the network management apparatus 1. The bus may include a wired interconnection or a wireless interconnection.

The number and arrangement of components shown in FIG. 19 are provided as an example. In practice, the network management apparatus 1 may include additional components, fewer components, different components, or differently arranged components than those shown in FIG. 19. Additionally, or alternatively, a set of components (e.g., one or more components) of the network management apparatus 1 may perform one or more functions described as being performed by another set of components of the network management apparatus 1. Further, one or more method steps described in any of the embodiments may be performed utilizing a plurality of the network management apparatus 1 in communication with one another.

Aspects of the present disclosure can include a computer-readable storage medium storing a program. Here, the program includes instructions that, when executed by the CPU (at least one of the one or more processors) of the network management apparatus 1, cause the network management apparatus 1 to perform at least one of the foregoing methods.

It should be noted that although the specific embodiment has been described above, the embodiment is merely an example, and is not intended to limit the scope of the present disclosure. The apparatuses and methods described in the present specification can be embodied in other forms than those described above. In addition, omissions, substitutions, and changes can be appropriately made to the embodiment described above without departing from the scope of the present disclosure. Forms with such omissions, substitutions, and changes are included in the scope of what is described in the claims and equivalents thereof, and belong to the technical scope of the present disclosure.

(Embodiments of Present Disclosure)

The present disclosure includes the following embodiments.

[1] A network management apparatus comprising one or more processors, at least one of the one or more processors performing processing comprising: a first storage process of storing logs of a plurality of components constituting a virtualization environment of a network; a second storage process of storing correspondence information in which, for each failure that may occur in the network, error logs of the plurality of components related to the failure are associated with each other; a search process of searching, when a failure occurs in the network, based on an error log of a first component among the plurality of components, for an error log of a second component related to the failure from the stored logs using the correspondence information; and a presentation process of presenting a result of the search to a user.

[2] The network management apparatus according to [1], wherein the second storage process includes storing the correspondence information in which keywords representing contents of the error logs of the plurality of components related to the failure are associated with each other, and the search process includes searching, based on a keyword representing contents of the error log of the first component, for a keyword representing contents of the error log of the second component with reference to the correspondence information, and searching for the error log of the second component from the stored logs based on the searched keyword.

[3] The network management apparatus according to [2], wherein the presentation process includes presenting, as a result of the search, information including the keyword representing the contents of the error log of the first component and the keyword representing the contents of the error log of the second component searched with reference to the correspondence information.

[4] The network management apparatus according to any one of [1] to [3], wherein the presentation process includes presenting, when the error log of the second component is searched from the stored logs in the search process, information including a link to the searched error log of the second component as a result of the search.

[5] The network management apparatus according to any one of [1] to [4], wherein the plurality of components includes a virtualized infrastructure and an application on the virtualized infrastructure.

[6] The network management apparatus according to [5], wherein the first component is the application, the second component is the virtualized infrastructure, and the presentation process includes presenting, when an error log of the virtualized infrastructure related to the failure is searched from the stored logs in the search process, the virtualized infrastructure as a candidate for a cause of the failure.

[7] The network management apparatus according to [5] or [6], wherein the first component is the application, the second component is the virtualized infrastructure, and the presentation process includes presenting, when an error log of the virtualized infrastructure related to the failure is not searched from the stored logs in the search process, the application as a cause of the failure.

[8] The network management apparatus according to any one of [5] to [7], wherein the first component is the virtualized infrastructure, the second component is the application, and the presentation process includes presenting, when an error log of the application related to the failure is searched from the stored logs in the search process, the application as a range to be affected by the failure.

[9] A network management method comprising: storing logs of a plurality of components constituting a virtualization environment of a network; storing correspondence information in which, for each failure that may occur in the network, error logs of the plurality of components related to the failure are associated with each other; when a failure occurs in the network, searching, based on an error log of a first component among the plurality of components, for an error log of a second component related to the failure from the stored logs using the correspondence information; and presenting a result of the search to a user.

[10] A network management system comprising one or more processors, at least one of the one or more processors performing processing comprising: a first storage process of storing logs of a plurality of components constituting a virtualization environment of a network; a second storage process of storing correspondence information in which, for each failure that may occur in the network, error logs of the plurality of components related to the failure are associated with each other; a search process of searching, when a failure occurs in the network, based on an error log of a first component among the plurality of components, for an error log of a second component related to the failure from the stored logs using the correspondence information; and a presentation process of presenting a result of the search to a user.

What is claimed is:

1. A network management apparatus comprising one or more processors, at least one of the one or more processors performing processing comprising:
 rendering a virtualization environment of a network that includes hardware resources, a virtualization layer, and virtual machines;
 accessing a first memory maintaining a log storage database storing logs of a plurality of components constituting the virtualization environment of the network and a plurality of components associated with a plurality of applications on an application side;
 accessing a second memory maintaining a log dictionary storing correspondence information in which, for each failure that may occur in the network, keywords representing content of error logs of the plurality of applications and keywords representing the content of the error logs of the virtualized environment are associated with each other;
 searching, when a failure occurs in the network, based on a keyword representing content of the error log of a first component belonging to one of the plurality of applications or the virtualized environment, for a keyword representing content of the error log of a second component belonging to the other of the plurality of applications or the virtualized environment from the log dictionary;
 searching for the error log of the second component based on the searched keyword from the stored logs;
 generating a result of the search including a correspondence between the keyword representing the content of the error log of the first component and the keyword representing the content of the error log of the second component; and
 presenting, on a display component, the result of the search to a user.

2. The network management apparatus according to claim 1, wherein
 the presenting the result includes presenting, when the error log of the second component is searched from the stored logs, information including a link to the searched error log of the second component as a result of the search.

3. The network management apparatus according to claim 1, wherein
 the first component is an application,
 the second component is a virtualized infrastructure, and
 the presenting the result includes presenting, when an error log of the virtualized infrastructure related to the failure is searched from the stored logs, the virtualized infrastructure as a candidate for a cause of the failure.

4. The network management apparatus according to claim 1, wherein
 the first component is an application,
 the second component is a virtualized infrastructure, and
 the presenting the result includes presenting, when an error log of the virtualized infrastructure related to the failure is not searched from the stored logs, the application as a cause of the failure.

5. The network management apparatus according to claim 1, wherein
 the first component is a virtualized infrastructure,
 the second component is an application, and
 the presenting the result includes presenting, when an error log of the application related to the failure is searched from the stored logs, the application as a range to be affected by the failure.

6. A network management method comprising:
 rendering a virtualization environment of a network that includes hardware resources, a virtualization layer, and virtual machines;
 storing, in a first memory maintaining a log storage database, logs of a plurality of components constituting the virtualization environment of the network and a plurality of components associated with a plurality of applications on an application side;
 storing, in a second memory maintaining a log dictionary, correspondence information in which, for each failure that may occur in the network, keywords representing content of error logs of the plurality of applications and keywords representing the content of the error logs of the virtualized environment are associated with each other;
 when a failure occurs in the network, searching the log dictionary, based on a keywork representing content of an error log of a first component belonging to one of the plurality of applications or the virtualized environment, for a keyword representing content of the error log of a second component belonging to the other of the plurality of applications or the virtualized environment;
 searching for the error log of the second component based on the searched keyword from the stored logs;
 generating a result of the search including a correspondence between the keyword representing the content of the error log of the first component and the keyword of representing the content of the error log of the second component; and
 presenting, on a display component, the result of the search to a user.

7. A network management system comprising one or more processors, at least one of the one or more processors performing processing comprising:
 rendering a virtualization environment of a network that includes hardware resources, a virtualization layer, and virtual machines;
 accessing a first memory maintaining a log storage database storing logs of a plurality of components constituting the virtualization environment of the network and a plurality of components associated with a plurality of applications on an application side;
 accessing a second memory maintaining a log dictionary storing correspondence information in which, for each failure that may occur in the network, keywords representing content of error logs of the plurality of applications and keywords representing the content of the error logs of the virtualized environment are associated with each other;
 searching, when a failure occurs in the network, based on a keyword representing content of the error log of a first component belonging to one of the plurality of applications or the virtualized environment, for a keyword representing content of the error log of a second component belonging to the other of the plurality of applications or the virtualized environment from the log dictionary;

searching for the error log of the second component based on the searched keyword from the stored logs;

generating a result of the search including a correspondence between the keyword representing the content of the error log of the first component and the keyword representing the content of the error log of the second component; and presenting, on a display component, the result of the search to a user.

* * * * *